Oct. 3, 1967  F. W. STEERE, JR., ET AL  3,344,684

GRIP

Filed Oct. 5, 1965  3 Sheets-Sheet 1

INVENTORS
FRANK W. STEERE, JR.
JOHN R. RUSSELL
BY

ATTORNEY

Oct. 3, 1967  F. W. STEERE, JR., ET AL  3,344,684
GRIP
Filed Oct. 5, 1965  3 Sheets-Sheet 2

INVENTORS
FRANK W. STEERE, JR
JOHN R. RUSSELL
BY
ATTORNEY

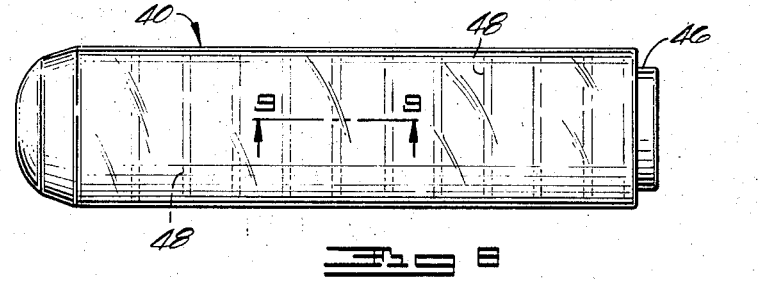
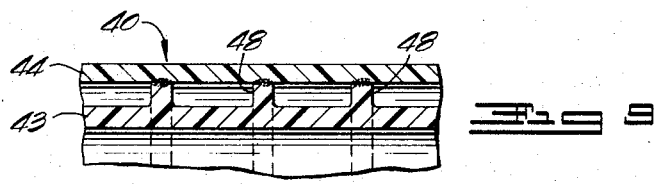
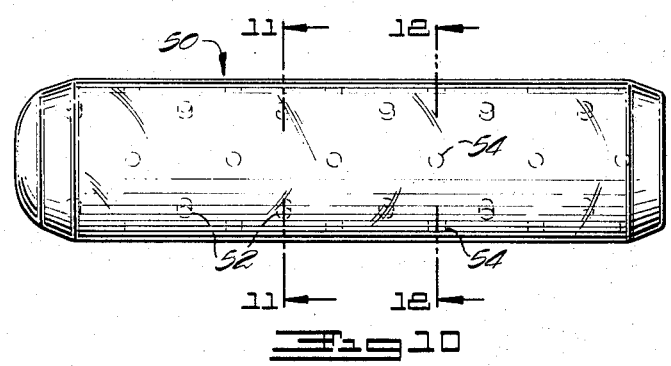
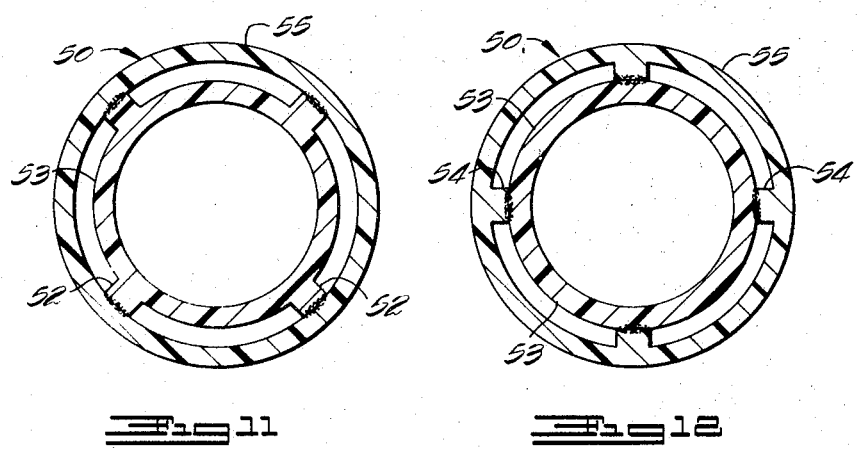
INVENTORS
FRANK W. STEERE, JR
JOHN R. RUSSELL
ATTORNEY

United States Patent Office 3,344,684
Patented Oct. 3, 1967

3,344,684
GRIP
Frank W. Steere, Jr., Akron, and John R. Russell, Cuyahoga Falls, Ohio, assignors to Steere Enterprises Inc., Tallmadge, Ohio, a corporation of Ohio
Filed Oct. 5, 1965, Ser. No. 492,992
15 Claims. (Cl. 74—551.9)

ABSTRACT OF THE DISCLOSURE

A plastic grip for the handlebar of a bicycle of motorcycle or the like, is formed of two shells. The outer shell at least is transparent or translucent. The inner shell may be opaque, but this is not essential. The two shells are colored and are spaced by projections on one of the shells that contact the other shell. These projections form a pattern when viewed through the outer shell and attractive and unusual color effects are produced.

---

This invention relates to a grip for an article of manufacture such as, for instance, a handlebar, tools such as shears, etc.

The grip is made of two shells. Both shells are made of a flexible plastic, and at least the outer shell is self-supporting. The inner shell may be opaque, translucent or transparent. It makes tight contact with the handlebar or other support to which it is applied. Usually, it is not cemented to the support, but it may be. Both shells are generally cylindrical and will usually cover all or a part of the end of the support, particularly if the shells are formed by dipping, although the ends of dipped shells may be cut away. Either shell may be translucent or transparent, and the inner shell may be opaque.

One or both of the shells are provided with supporting projections which space the body of the outer shell away from the body of the inner shell. These projections may be ribs or separate projections of small area or any other shape. If ribs, they may, for example, extend longitudinally of the grip, or around the grip as separate rings or a spiral. Ribs which extend in one direction may be intersected by ribs which extend in a different direction. Usually, the shells are formed by dipping on a form, and one end is closed. If the form is indented to form projections on the inner surface of a shell, the shell may be reversed to provide projections on its outer surface.

If the grip is to be used on a handlebar is is customary to provide a hole in its closed end to permit attachments, such as streamers, and to exhaust air when the grip is positioned on the handlebar. The inner shell may or may not be adhered to the support by adhesive. Adhesive may be applied to the surface of the projections to adhere the shells to one another.

The outer shell may be colored, and if it is transparent or translucent, the inner shell may be colored the same or a different color to give an attractive appearance.

Usually the shells will cover the same area of the support, but one may be longer than the other. For instance, if the projections are on the inner surface of the outer shell, the inner shell may protrude beyond the inner edge of the outer shell to form a smooth collar to provide an attractive appearance.

The following dipping formula for the shells is illustrative. They need not be vinyl compositions. The different shells may be made of different plastics. A typical dipping formula for a transparent, water-white outer shell is:

| | Parts |
|---|---|
| Polyvinylchloride homopolymer, plastisol grade (clear) | 100 |
| Dioctyl phthalate | 55 |
| Epoxidized soya bean oil (Paraplex G–62) | 8 |
| Liquid barium-cadmium stabilizer (Ferro 12–V–6) | 3 |

The inner shell may be of the same composition but pigmented (e.g. with titanium dioxide) to make it opaque. A small amount of dye or pigment may be added to the outer shell to tint it. Pigments or dyes may be used in either or both shells, as desired.

The shells need not be dipped, but may be fabricated as desired.

The inner shell usually fits flush against the support and is then of any desired thickness. Usually, the wall gauge of the body of the outer shell will be from about .050 to .100 inch, more or less, and the supporting projections may be about this thick so as to support the outer shell away from the inner shell and give the desired cushioning effect except at both ends of the grip where intimate contact is desirable. For different formulae different wall thicknesses will be preferred to give the desired flexibility and resilience to the grip.

The height and spacing of the supporting projections will depend upon the composition of the plastic and the desired design features. Usually, with plastic of the above composition, the supporting projections will not exceed ⅛ inch at their maximum height, and usually they will be spaced at least .06 inch apart to permit proper flow of the plastic. For a handlebar with longitudinal ribs, there should be some six or more ribs to provide uniform circumferential spacing.

The invention is further described in connection with the accompanying drawings, in which:

FIGURE 8 is a plan view of a different grip having radial ribs on the outer surface of the inner shell;

FIGURE 9 is a sectional view on the line 9—9 of FIGURE 8;

FIGURE 10 is a plan view of a different grip in which the shells are separated by small knobs;

FIGURE 11 is a sectional view on the line 11–11 of FIGURE 10, showing small knobs on the outer surface of the inner shell; and FIGURE 12 is a sectional view on the line 12–12 of FIGURE 10 showing small knobs on the inner surface of the outer shell.

Figure 1:
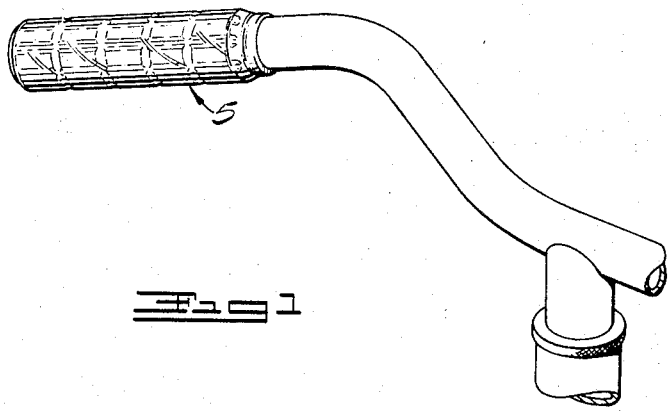
FIGURE 1 is a perspective view of a grip on a hollow handlebar.
Figure 2:
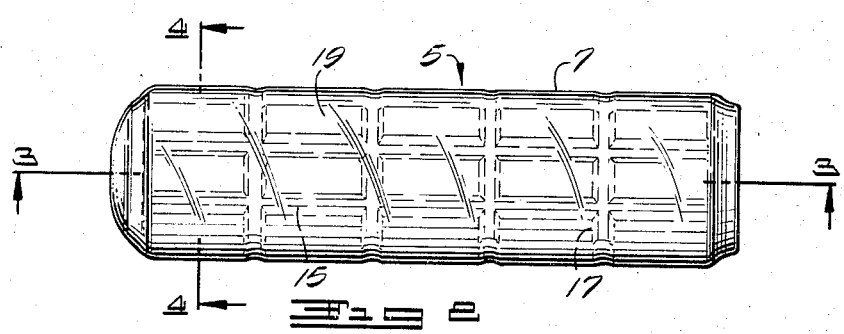
FIGURE 2 is an enlarged plan view of the grip shown in FIGURE 1 the outer shell of which is provided with intersecting longitudinal and radial ribs on its inner surface.
Figure 3:
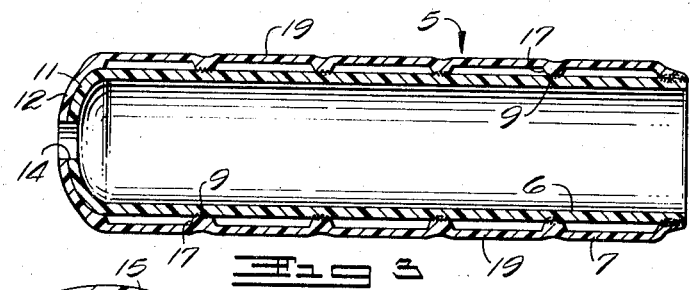
FIGURE 3 is a sectional view on the line 3–3 of FIGURE 2.
Figure 4:
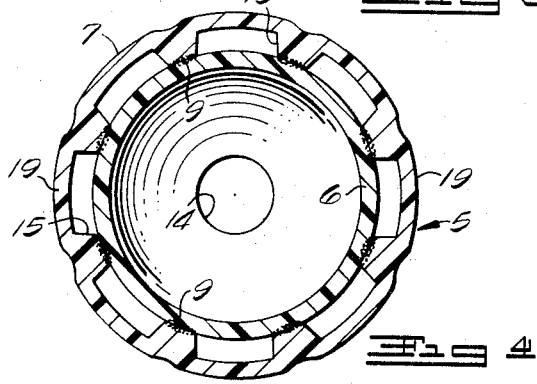
FIGURE 4 is a sectional view on the line 4–4 of FIGURE 3.

The grip 5 of FIGURES 1 to 4 is composed of an inner shell 6 and an outer shell 7. The inner shell is preferably opaque, and the outer shell is translucent or transparent. A white inner shell and an outer shell tinted any usual color makes an attractive product. The two shells are united by the adhesive 9. The outer ends 11 and 12 of both shells extend inwardly to partially cover the opening at the end of the handlebar. These ends are usually in contact with one another and usually are provided with punched-out concentric openings 14.

Longitudinal ribs 15 are intersected by radial ribs 17 which contact the inner shell 6 throughout their lengths. The body 19 of the outer shell between the ribs flexes inwardly when grasped, and, generally, the projections are distorted by the pressure used to grasp the grip, the amount of flattening varying with the force applied. Adhesive 9 prevents the outer shell from shifting on the inner shell when gripped.

Figure 5:
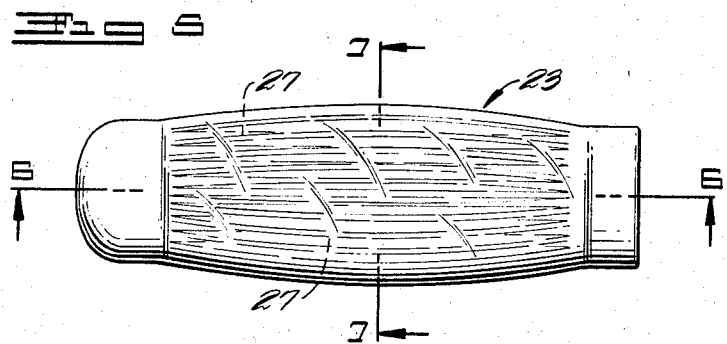
FIGURE 5 is a plan view of a different grip in which there are only longitudinal ribs on the inner surface of the outer shell.
Figure 6:
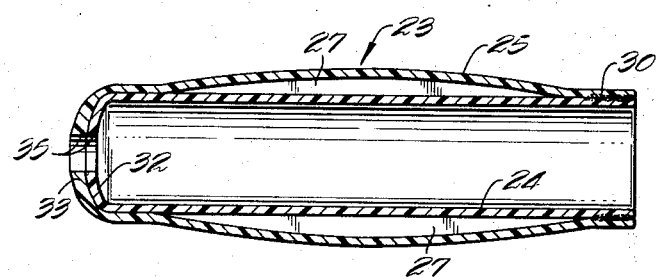
FIGURE 6 is a sectional view on the line 6–6 of FIGURE 5.
Figure 7:
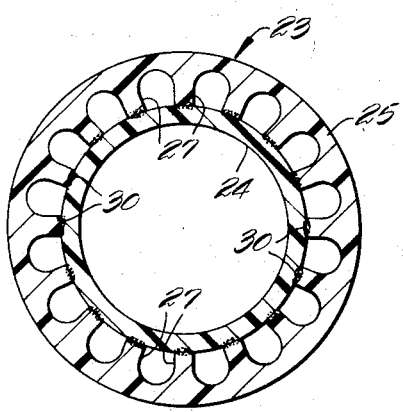
FIGURE 7 is a sectional view on the line 7–7 of FIGURE 5.

The grip 23 of FIGURES 5 to 7 is of somewhat different shape. It is formed of the inner and outer shells 24 and 25. The ribs 27 are all longitudinal, and they are much taller in the center than at the ends. There are not cross ribs. The shells are united by the adhesive 30. The ends 32 and 33 will partially cover the open end of the handlebar, in which openings 35 are punched.

The shell 24 will usually be an opaque white or red, green or blue, etc., and the outer shell may be colorless or attractively tinted, and be transparent or translucent.

The grip 40 of FIGURES 8 and 9 is formed of the inner shell 43 and outer shell 44. The inner shell is longer than the outer shell and forms the collar 46 which is usually of a color which contrasts with the color of the outer shell to produce an attractive effect. The ribs 48 are on the outer surface of the inner shell. The inner shell is dipped on a form, the outer surface of which is grooved, and this shell is reversed after dipping to provide the ribs on its outer surface as shown in FIGURE 9. Alternatively, the inner shell may be injection molded or compression molded. It may be a different plastic from the outer shell, and may even be formed of some non-plastic material.

The projections which separate the two shells may be small distinct elements of any shape—round, square, diamond, etc. FIGURES 10 to 12 show a grip with small knobs on each shell. If the knobs are on the outer shell only, and it is transparent or translucent, a pleasing effect is produced. By making the inner shell a different color from the outer shell and providing knobs on each shell, a different pleasing effect is obtained. Knobs or small projections of another shape may be used in combination with ribs.

FIGURES 10 to 12 illustrate a grip 50 in which some knobs 52 are on the inner shell 53 and other knobs 54 are on the outer shell 55.

The drawings are illustrative. The design effects which can be achieved are not easily illustrated in patend drawings although FIGURES 1, 2, 5, 8 and 10 indicate that ribs, etc. between the two shells can be seen through the outer shell if transparent or translucent, and this gives a ribbed, etc. effect although the surface of the outer shell is not uncomfortable. The drawings suggest various structures designed for use on a cylindrical support. The cross section of the support may be square, oval, etc. and in that case the projections can be made of different heights so that the outer surface of the outer shell is generally cylindrical.

The invention is disclosed in the claims which follow. What we claim is:

1. A grip designed to fit over a support, and formed of two structural elements and only two structural elements, namely (1) a plastic inner shell and (2) a resilient outer shell located over the inner shell, said inner shell being visible through said outer shell and being supported away from the inner shell by pattern-forming projections formed on at least one of the adjacent faces of the respective shells, which projections on one of said faces are constantly in contact with the other of said adjacent surfaces.

2. The grip of claim 1 in which the inner shell is opaque.

3. The grip of claim 1 in which at least some of the projections are on the inner surface of the outer shell.

4. The grip of claim 1 in which at least some of the projections are on the outer surface of the inner shell.

5. The grip of claim 1 in which the shells are adhered to one another by an adhesive.

6. The grip of claim 1 in which at least some of the projections are ribs which extend longitudinally of the grip.

7. The grip of claim 1 in which at least some of the projections are ribs which extend radially of the grip.

8. The grip of claim 1 in which at least some of the projections are of relatively small area and are distinct from one another.

9. The grip of claim 1 in which at least some of the projections are knobs.

10. The grip of claim 1 the diameter of which intermediate the ends is substantially larger than the diameters at its respective ends.

11. The grip of claim 1 in which the diameters of the two shells are lessened sharply at one end of the grip so that the grip covers the outer edge of the end of the support.

12. A grip for a cylindrical, hollow handlebar or the like which includes (1) an opaque, one piece plastic inner shell which comprises a cylindrical portion of uniform inside cross section which fits tight around said handlebar or the like and at its outer end extends inwardly forming an end wall which at least partially covers the end of said handlebar or the like, and (2) a flexible, plastic outer shell through which said inner shell is visible, which outer shell covers the inner shell and at its outer end extends inwardly forming an end wall which at least partially covers the end of said handlebar or the like, spaced, pattern-forming projections extending from one shell into constant contact with the other shell; the body of the outer shell and the projections being stiff enough to support themselves but said body being sufficiently flexible to provide a desirable cushion when gripped by the pressure used in gripping a handlebar when in use.

13. The grip of claim 12 in which the diameters of the two shells are lessened sharply at one end of the grip so that the grip is adapted to cover the outer edge of the handlebar and the shells are united by adhesive.

14. A grip designed to fit over a support, which grip is formed of an inner one-piece shell and a resilient, plastic outer shell located over the inner shell and supported away from the inner shell by pattern-forming projections formed on at least one of the adjacent faces of the respective shells, said inner shell being visible through said outer shell, which projections on one of said faces are constantly in contact with the other of said adjacent surfaces and the shells are adhered to one another.

15. The grip of claim 14 in which all of the projections are on the outer shell.

References Cited

UNITED STATES PATENTS

| 593,162 | 11/1897 | Miller | 74—551.9 |
| 599,131 | 2/1898 | King | 74—551.9 |
| 2,222,121 | 11/1940 | Roberts | 74—551.9 |
| 3,016,763 | 1/1962 | Albert | 74—551.9 |

FOREIGN PATENTS

| 4,550 | 2/1903 | Great Britain. |
| 348,981 | 2/1932 | Great Britain. |

FRED C. MATTERN, JR., *Primary Examiner.*